Sept. 2, 1952 E. H. LAND 2,609,296
COMPOSITE PHOTOGRAPHIC PRODUCT COMPRISING A PHOTOSENSITIVE
ELEMENT AND A CONTAINER CARRYING A LIQUID
FOR PROCESSING SAID ELEMENT
Filed May 21, 1945 3 Sheets-Sheet 1
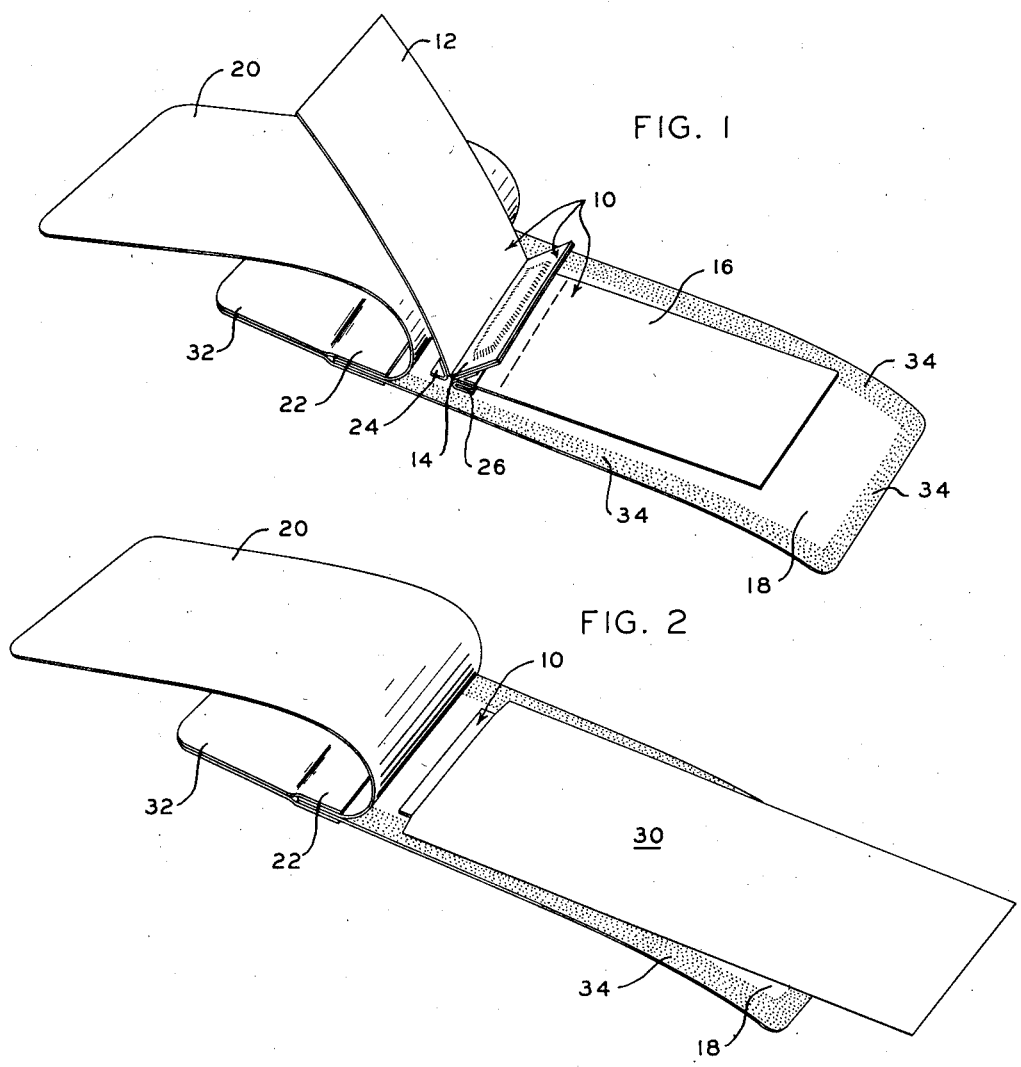
INVENTOR.
Edwin H. Land
BY Donald L. Brown
Attorney Sept. 2, 1952 E. H. LAND 2,609,296
COMPOSITE PHOTOGRAPHIC PRODUCT COMPRISING A PHOTOSENSITIVE
ELEMENT AND A CONTAINER CARRYING A LIQUID
FOR PROCESSING SAID ELEMENT
Filed May 21, 1945 3 Sheets-Sheet 2

INVENTOR.
Edwin H. Land
BY Donald L. Brown
Attorney

Sept. 2, 1952                 E. H. LAND                 2,609,296
COMPOSITE PHOTOGRAPHIC PRODUCT COMPRISING A PHOTOSENSITIVE
ELEMENT AND A CONTAINER CARRYING A LIQUID
FOR PROCESSING SAID ELEMENT
Filed May 21, 1945                                 3 Sheets-Sheet 3

INVENTOR.
Edwin H. Land
BY Donald L. Brown
Attorney

Patented Sept. 2, 1952

2,609,296

UNITED STATES PATENT OFFICE 2,609,296

COMPOSITE PHOTOGRAPHIC PRODUCT COMPRISING A PHOTOSENSITIVE ELEMENT AND A CONTAINER CARRYING A LIQUID FOR PROCESSING SAID ELEMENT

Edwin H. Land, Cambridge, Mass., assignor to Polaroid Corporation, Cambridge, Mass., a corporation of Delaware Application May 21, 1945, Serial No. 594,892

18 Claims. (Cl. 95—8)

This invention relates to photography, and more particularly to novel composite photographic films.

One object of the present invention is to provide a novel composite photographic film which may be removed, for example, in daylight from the camera in which the photosensitive layer thereof has been exposed without effecting further exposure of said layer to actinic light.

Another object is to provide a film of the above type which may be readily loaded into a camera in daylight without exposing or fogging the photosensitive layer thereof.

Still another object is to provide a novel film pack having one or both of the above features and comprising a photosensitive layer and means adapted, subsequent to exposure of said layer and upon application of pressure, to give a fixed positive image of the subject matter to which said layer has been exposed.

Further objects are the provision of a novel composite film comprising a photosensitive layer and a pair of cover sheets of light-impervious material for said layer; of a film including, in addition to said cover sheets, a removable, light-impervious envelope for the photosensitive layer; of a film embodying, in addition to the light-impervious cover sheets and the photosensitive layer, means releasably containing and adapted to release, upon application of pressure to said film, a photographic reagent comprising a developer for said layer; and of a film including the cover sheets, the photosensitive layer, a receiving layer, and ingredients in the photographic reagent which, upon permeation of said receiving layer and said photosensitive layer, are adapted to provide a fixed, positive image in or on said receiving layer.

These and other objects of the invention will in part be obvious and will in part appear hereinafter.

The invention accordingly comprises the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a perspective view of one form of novel photographic element comprehended by the present invention, said element being shown for purposes of clarity with several of the laminae thereof separated from one another;

Fig. 2 is a view similar to Fig. 1 of the element of Fig. 1, showing an additional novel light barrier for the photosensitive layer of said photographic element;

Figure 3:
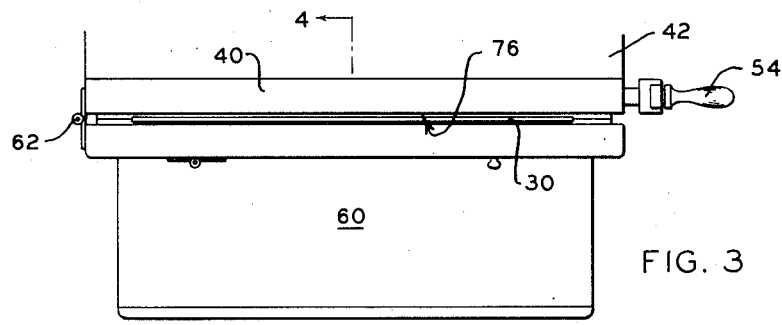
Fig. 3 is a top plan view, with parts broken away, of a novel camera attachment which may be employed for utilizing said photographic element to obtain fixed positive images of subject matter to which said element is exposed in the camera.

Referring to Fig. 1, there is shown one form of composite film means comprehended by the present invention and, as illustrated, said means comprise a photosensitive film unit 10 wherein a latent image may be obtained by differential exposure to actinic light. Film unit 10 may be a frame of any one of the liquid-carrying, self-developing films for forming positive images shown in my copending applications Serial No. 539,550, filed June 9, 1944, for Photographic Product, Process and Apparatus, and Serial No. 578,379, filed February 17, 1945, for Photographic Product (both of which have been abandoned and replaced by application Serial No. 64,870, filed December 11, 1948, and which issued as Patent No. 2,543,181 on February 27, 1951).

In a preferred form, film unit 10 comprises a film 12 which includes a layer of photosensitive material, preferably of the type which is rendered developable by exposure to light, e. g., an emulsion of silver halide, or of a mixture of silver halides, or of a mixed silver halide, mounted on a suitable transparent film base such as a sheet of cellulose acetate, cellulose nitrate or cellulose acetate butyrate; a liquid material releasably carried out of contact with said photosensitive layer in suitable containing means 14; and a base 16 preferably formed of a relatively liquid-absorbent, liquid-permeable material in which or on which a positive image of the subject matter of a latent image formed in said photosensitive layer may be obtained when the liquid material in container 14 is spread between film 12 and said base. It is understood that the photosensitive emulsion side of said film adjoins said base when said elements are in operative assembly.

Base 16 may serve as the only receiving layer for the image-forming component which provides the desired fixed positive image so that the image is entirely formed therein, or it may serve as a base on which the image-receiving layer is formed by the reagent, or it may cooperate with a receiving layer formed by the reagent so that part of the positive image is obtained in said base and part in said receiving layer.

Container 14 (Fig. 1) for the liquid reagent is preferably an elongated, water-vapor impervious and oxygen impervious sac or pod which is mounted transversely of the film unit between film 12 and base 16 adjacent one edge of said film and preferably beyond the portion of said film adapted to be exposed in the camera. Container 14 may, for example, be formed of a single sheet of water-vapor and oxygen impervious material such as a wax-coated metal foil, and is preferably detachably secured as by adhesion to base 16 or film 12, being so formed that the application of a suitable mechanical stress thereto as, for example, the squeezing together of the faces of the film unit, will release the liquid reagent in said container in only one direction longitudinally of the film so as to spread said reagent between the photosensitive layer of film 12 and base 16.

To insure a relatively uniform permeation of at least the surface layer of the exposed frame upon release of the reagent, the reagent is relatively viscous, preferably having a viscosity in excess of fifty centipoises. A reagent having a lesser viscosity may be used, but if substantially less viscous, the reagent may be too greatly absorbed in some portions of the photosensitive layer while other portions remain relatively dry, affecting the uniformity of the image which is obtained. The thickening agent may be a water-soluble, film-forming material such as a high molecular weight polymer or protein, as, for example, gelatin or a polymeric, water-soluble ether inert to an alkali solution, such as hydroxyethyl cellulose or a metal salt of carboxymethyl cellulose, for example sodium or aluminum carboxymethyl cellulose which, when spread over a water-absorbent base, while in contact with a photosensitive layer, quickly forms a relatively firm, dimensionally stable film. When a reagent of this character is utilized, base 16 is preferably formed of a water-absorbent material such as alpha paper, and the fixed, positive image is obtained in part in said base and in part in the film formed by said reagent.

One form of liquid reagent includes as ingredients a developer for reducing exposed silver halide to silver and a compound for reacting with the undeveloped silver halide to form a silver complex soluble in the reagent. The materials are selected so that the complex-forming reaction takes place at a less rapid rate than the rate at which the developer will reduce the exposed silver salt but at a more rapid rate than the rate at which the developer will reduce the unexposed silver salt whereby a predetermined portion of the unexposed silver salt is transformed to the soluble complex. The reagent also preferably contains an alkali and a suitable thickener, as, for example, a high molecular weight compound which is hydrolyzed by the alkali, such as a starch, sodium alginate, sodium carboxymethyl cellulose, hydroxyethyl cellulose, or polyvinyl alcohol. By subjecting unit 10 to a compressive force subsequent to exposure of film 12, the reagent in container 14 is released between base 16 and said film, and provides in or on said base a positive image of the subject matter to which said film was exposed.

In order that film unit 10 may be exposed in a camera and then, after exposure, withdrawn from said camera into the daylight without effecting further exposure of the photosensitive layer thereof to actinic light, there is provided, in combination with said unit, a novel arrangement of elements which cooperates with said unit as the latter is withdrawn from a camera to provide a light-tight envelope therefor.

As shown, a pair of light-impervious sheets 18 and 20, for example of black paper, are provided on opposite sides of unit 10, and are secured together at one end by a suitable hinge connection 22. The elements of unit 10 may be secured together to form a unitary composite structure which, in turn, may be secured as by a hinge connection to one of sheets 18 or 20 or may have its end between said sheets within hinge 22. In the form shown, however, unit 10 preferably has each of film 12 and base 16 separately attached to sheet 18 by suitable hinges 24 and 26, respectively, with film 12 adjacent sheet 20. Container 14 preferably adjoins said hinge connections for film 12 and base 16, and is detachably secured to either of the latter elements. As a result of these hinge connections, one or more sheets of material may be slidably inserted between base 16 and cover sheet 18, and film 12 may be readily separated from base 16 after the positive image is formed, said base being preferably provided with suitable perforations whereby it may be readily detached from the remainder of said film unit after the positive image is formed in or on said base. Hinge connection 22 is preferably provided with a suitable tab or longitudinal extension 32.

Each of sheets 18 and 20 is preferably larger in area than unit 10 and has the edge portions thereof extending beyond the edges of unit 10 on all sides of the latter. In order that these edge portions of said cover sheets may absorb the overflow of reagent which is squeezed from film unit 10, said sheets are preferably formed of relatively liquid-absorbent material such as paper, or such material is applied along said edge portions, thereby insuring that none of the reagent is ejected from the composite film assembly. In addition, the edges of at least one of said cover sheets, for example of sheet 18, are preferably provided with a suitable adhesive 34 whereby the bringing together of said sheets into face-to-face relation causes the same to adhere to one another and form a light-tight seal around film unit 10. The adhesive is selected so that the adhesion obtained is not very great and permits said sheets to be readily separated from one another when the image-forming reaction is complete and base 16 is to be separated from the remainder of the assembly.

With the above-described assembly of film unit 10 and sheets 18 and 20, it is possible by folding back sheet 20 in a camera to expose unit 10, and then, by bringing sheets 18 and 20 into face-to-face engagement as said assembly is withdrawn from the camera, to withdraw said assembly into daylight without further exposing film unit 10 to actinic light. Thus, the image-forming reaction may be carried out fully or in part outside the camera in the daylight.

It will be noted that while the assembly described above may be withdrawn from the camera subsequent to the exposure of film unit 10 without further exposing the photosensitive layer of said film unit, the assembly must nevertheless be operatively positioned in the camera in the absence of actinic light, for if sheet 20 is folded back in the presence of actinic light, it will fog the photosensitive layer of film unit 10. To make possible the loading of the above assembly into the camera in the daylight, said assembly is preferably provided with a light-impervious envelope or other suitable, readily removable means whereby the assembly may be positioned in a camera, sheet 20 may be folded back, and then the camera interior rendered light-tight. Thereafter, said additional light-impervious means may be removed from the assembly and the camera, leaving film unit 10 in condition for exposure.

In one form of the invention, said means comprises an envelope 30 (Fig. 2) formed, for example, of black paper, said envelope being preferably inserted around film unit 10 with the rear face thereof extending between the rear face of unit 10 and cover sheet 18. However, it is to be understood that in the event cover sheet 18 is secured to unit 10 over the entire rear area of the latter, the rear face of said envelope may extend behind said sheet whereby both unit 10 and sheet 18 are contained in said envelope. The latter is preferably sufficiently long or is provided with an end tab or extension such that a substantial portion thereof will extend beyond the ends of sheets 18 and 20 when the latter are operatively folded upon said envelope.

Figure 4:
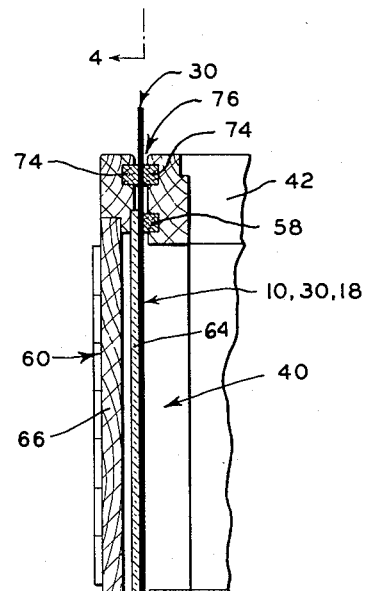
Fig. 4 is a sectional view taken substantially along line 4—4 of Fig. 3.

In order to render operative the novel film assembly described above, a novel camera or camera attachment may be provided, and preferably, said attachment is so constructed and arranged that it may be readily mounted in place of the removable back of cameras so equipped as, for example, cameras adapted to use a film pack or a holder for separate frames of cut film. One form of the novel attachment is shown in Figs. 3 and 4 and as shown comprises a frame structure 40 which may be detachably secured to the rear end of a camera 42 in place of the detachable film-pack holding back thereof. As shown, said frame structure outlines the exposure opening of said camera and has a depending extension 44 (Fig. 4) which serves to mount a suitable bracket 46. Operatively mounted on bracket 46 are a pair of pressure rollers 48 and 50, the tension exerted by said rollers upon sheet material passing therethrough being subject to accurate control by a suitable mechanism 52 which may be manually adjusted and which is operatively connected to said rollers to control the displacement of the axes thereof with respect to one another. Suitable means are provided for operating rollers 48, 50 from the exterior of the camera and, as shown, said means comprise a handle, knob or other manually operable mechanism 54 connected to one of said rollers. A suitable curved element, for example of sheet metal, cooperates with roller 50 and the bottom edge of extension 44 to provide a guideway 56 for a cover sheet of the novel film assembly described above. Around the exposure opening, defined by frame 40, there is preferably mounted in a suitable groove a strip 58 of a deformable material such as felt. A rear cover member 60 pivotally secured by a suitable hinge means 62 (Fig. 3) to frame 40 is adapted to pivot into operative engagement with said frame and render the interior of the camera light-tight. Said cover member is preferably provided with a ground glass 64 (Fig. 4) for focusing purposes, and is equipped with a conventional type rear door or shutter 66 which is hinged to said cover plate behind the ground glass and is normally held shut as by suitable springs. Member 60 comprises a housing structure 68 at its lower end which encloses the pressure roller mechanism, said housing structure being provided at its lower end with a strip 69 of suitable deformable material such as felt which cooperates with strip 70 of the same material in frame extension 44 to line and render light-tight an opening 72 which is formed in said attachment between said frame extension and said cover member for slidably removing a film contained in said attachment. A similar pair of felt linings or strips 74 are provided in the upper end of said attachment on opposite faces of the walls of an opening 76 whereby sheet material may be removed from the interior of said attachment in an upward direction without exposing the interior of said attachment to actinic light.

In operation, cover member 60 of the camera attachment is swung open and the novel film assembly described above is inserted within said attachment by having tab or extension 32 of hinge connection 22 fed between pressure rollers 48, 50 until said extension extends below the wall of opening 72. The assembly is inserted with cover sheet 20 foremost and said cover sheet is preferably folded back and fed through guideway 56 below the wall of opening 72. Envelope 30 has the upper end thereof projecting beyond the upper end of the attachment opposite that portion of frame 40 which forms one wall of opening 76. Thereafter rear cover member 60 is pivoted into operative engagement with frame 40 and renders the interior of said attachment light-tight. Envelope 30 is then removed from the film assembly through opening 76, placing film unit 10 in condition for exposure in the camera. After film unit 10 is exposed in the camera, pressure rollers 48, 50 are manually operated from the exterior of the camera so that the assembly comprising film unit 10 and cover sheets 18 and 20 is fed through said rollers and discharged from the camera through opening 72. The compressive force applied by said rollers causes the reagent contained in container 14 of film unit 10 to be released from said container and also causes said reagent to be uniformly spread, after release, over the entire area of the exposed photosensitive layer of film 12. The film assembly, when discharged from the camera, is permitted to remain light-tight until a sufficient time has elapsed to form a positive image in or on base 16 of the subject matter to which said film unit was exposed. Thereafter cover sheets 18 and 20 are separated from one another, film 12 is separated from base 16, and the latter is removed from the remainder of the film assembly providing a finished, fixed positive image of the subject matter to which said unit was exposed.

Figure 5:
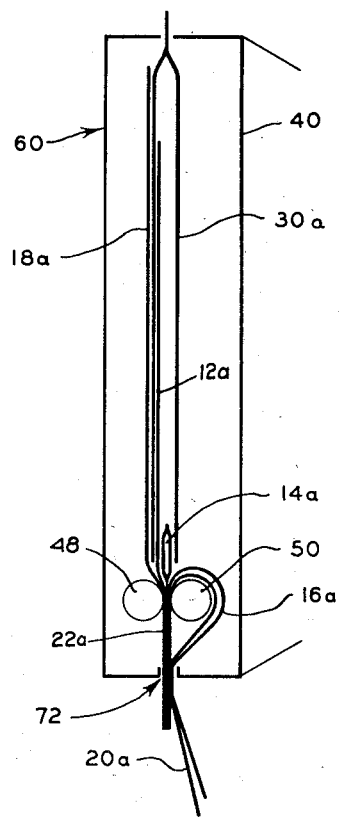
Figs. 5 and 6 are diagrammatic views illustrating the details of the construction of a modification of the photographic element of the invention and the manner in which the latter may be exposed within the attachment of Figs. 3 and 4.
Figure 6:
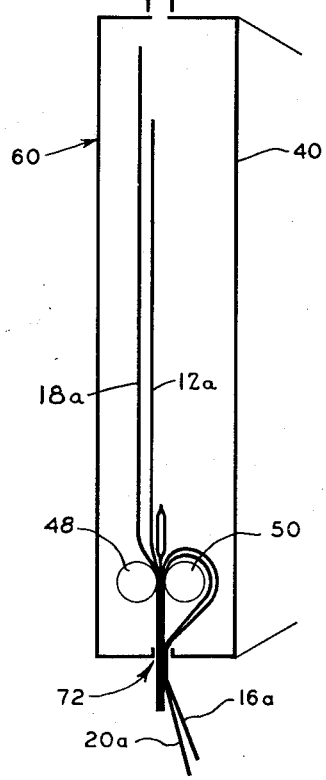

It will be noted that in the above-described embodiment of the novel film assembly there is obtained a positive image which is reversed left and right geometrically with respect to the subject matter photographed. To obtain a true unreversed image of the subject matter photographed, a novel modification of the film assembly described above may be utilized. One form of such embodiment is shown diagrammatically in Figs. 5 and 6 operatively mounted in the above-described camera attachment comprising cover member 60 and frame 40, the separation of the several laminae of the assembly being greatly exaggerated in the drawings for purposes of clarity. The film structure preferably comprises a pair of cover sheets 18a and 20a of similar construction to cover sheets 18 and 20 of the above-described embodiment. Adjacent to cover sheet 18a there is secured a frame of a photosensitive film 12a corresponding to film 12, and adjacent to cover sheet 20a there is secured a base member 16a corresponding to base 16. A suitable liquid container 14a for the reagent is provided between film 12a and base 16a and may be attached to the inner face, for example, of either said film or said base, or to the hinged connection 22a for cover sheets 18a and 20a. To permit the loading of this novel film assembly into the camera, a light-impervious envelope 30a may be provided to enclose cover sheet 18a and film 12a or to enclose only film 12a. In use, this modification of the novel film assembly of the invention is inserted into the camera with cover sheet 20a foremost, and the latter cover sheet, together with film base 16a, is folded back so as to extend through the guideway of the camera attachment at the rear of roller 50 and through opening 72. After envelope 30a has been removed from the attachment, film unit 10 is in condition for exposure and may be exposed. Thereafter, the assembly comprising cover sheets 18a and 20a and the elements secured thereto are metered between the pressure rollers 48, 50 and discharged from the camera. A positive image of the subject matter to which film 12a was exposed is formed in or on base 16a. Base 16a may be detachably adhered to sheet 18a so as to be readily removable therefrom after the positive image is formed therein or thereon. In this embodiment of the invention, it is also possible to use sheet 18a as the support for the photosensitive layer, as by casting the photosensitive emulsion on said sheet.

It is to be understood that attachment 40, 60, with the film assembly loaded therein, may be provided as a film pack for cameras equipped to receive it. Envelope 30 may be operatively positioned to shield the photosensitive layer in the pack whereby the latter may be operatively mounted in the camera in the presence of actinic light or the pack may be assembled without said envelope and mounted in the camera in the absence of actinic light as, for example, in a dark room.

Since certain changes may be made in the above product, and different embodiments of the invention could be made without departing from the scope of the invention herein involved, it is intended that all matter contained in the above description or shown in the accompanying drawings shall be interpreted as illustrative and not in a limiting sense.

What is claimed is:

1. As a new article of manufacture, in combination, a magazine, and a film unit held by said magazine; said film unit comprising a pair of liquid-confining layers at least one of which includes a photosensitive portion capable of having an image formed therein upon photoexposure, a pair of light-excluding layers opaque to light actinic to said photosensitive portion, a rupturable containing means holding a processing liquid for said photosensitive portion, means for securing together said four layers and said rupturable containing means so that said light-excluding layers are hinged together and so as to permit said light-excluding layers and said liquid-confining layers to be superposed with said containing means positioned for releasing its liquid content between said liquid-confining layers and with said light-excluding layers forming an outer light-tight enclosure for said photosensitive portion preventing the light from reaching the same, and an envelope which is slidably mounted on said film unit to enclose said photosensitive layer and protect the latter from premature exposure to light actinic thereto; said magazine comprising means defining a first withdrawal passage, means defining a second withdrawal passage, and means for holding a photosensitive layer framed for exposure; said film unit being mounted in said magazine so that said photosensitive portion is held in exposure position by said framing means and so that the part of said unit adjacent the hinge extends through said first withdrawal passage to the exterior of said magazine, the one of said light-excluding layers normally covering the side of said film unit through which said photosensitive portion is to be exposed being pivoted back away from said portion in said magazine, the end of said envelope extending through said second withdrawal passage and being capable of removal from said film unit and said magazine through said second withdrawal passage, said light-excluding layers being operative, upon withdrawal of said film unit from said first passage, to form a protective barrier for said photosensitive portion to prevent the fogging thereof.

2. The combination of claim 1 wherein the second withdrawal passage is directly opposite said first withdrawal passage and a portion of the envelope projects beyond the ends of said light-excluding layers, a part only of this projecting portion extending through said second withdrawal passage.

3. A photographic product containing a silver halide developer for developing an image in said product, said product comprising a first layer which is liquid-confining and photosensitive and which includes at least a silver halide portion capable of having a latent image formed therein upon photoexposure, a second layer which is liquid-confining, a rupturable containing means holding a liquid, a third layer which is light excluding and opaque to light actinic to said photosensitive layer, a fourth layer which is light excluding and opaque to light actinic to said photosensitive layer, hinge means securing together said four layers and said rupturable containing means so as to permit said light-excluding layers and said liquid-confining layers to be superposed with said containing means positioned for releasing said liquid between said liquid-confining layers and with said light-excluding layers forming an enclosure for said photosensitive layer, which enclosure prevents light from reaching the photosensitive layer, and an envelope having an open end and being opaque to light actinic to said photosensitive layer, said envelope being slidably mounted over at least said photosensitive layer so as to substantially enclose said photosensitive layer and being of a length such that a portion thereof projects beyond the free ends of said hinged light-excluding layers, said envelope being slidably removable from its operative light-excluding relationship with said photosensitive layer, said hinge means providing a leader for holding said four layers and said containing means against movement while said envelope is removed from said photosensitive layer, said liquid in said containing means being in an amount sufficient to render said developer effective to develop an image in the silver halide portion of said photosensitive layer, said envelope functioning to prevent premature exposure of the photosensitive layer and the enclosure formed by said light-excluding layers functioning to prevent fogging of said photosensitive layer after the formation of the latent image therein.

4. The product of claim 3 wherein the envelope contains both said liquid-confining layers.

5. The product of claim 3 wherein the envelope contains only the liquid-confining layer having said photosensitive portion.

6. A photographic product containing a photosensitive element, a photographic reagent capable of processing said element, and processing liquid in sufficient quantity to render said reagent effective for processing said element, said photosensitive element comprising as a photosensitive material thereof a heavy metal salt capable of forming a latent image upon photoexposure and capable of development to produce a visible image comprising the metal of said salt, said product comprising a first layer, a second layer, a rupturable containing means holding said processing liquid, a third layer substantially opaque to visible light actinic to said photosensitive element, a fourth layer substantially opaque to visible light actinic to said photosensitive element, hinge means providing a leader, and an envelope having walls which are opaque to visible light actinic to said photosensitive element, said hinge means, said first and second layers and said containing means being so attached together as to permit said first and second layers to be superposed with said photosensitive element held between the outer surfaces thereof and with said containing means in a position to release its liquid between said first and second layers to permeate said photosensitive element, said processing liquid, upon release from said containing means, rendering said reagent effective to process said photosensitive element, said third and fourth layers being secured together by said hinge means so as to be superposable on both sides of said first and second layers when the latter are superposed, said envelope surrounding at least said photosensitive element to protect the latter against premature exposure to light actinic thereto, said envelope having an end thereof extending beyond the end of the remainder of the product, said envelope end being located at the opposite end of said product from said hinge means, said envelope being slidably associated with said photosensitive element so as to be readily slipped therefrom when moved in a direction away from said leader, said four layers, said photosensitive element and said containing means being movable as a unit together with said leader, said third and fourth layers, when superposed upon one another, enveloping said photosensitive element to protect the latter from light actinic thereto subsequent to the exposure thereof and the removal therefrom of said envelope.

7. A photographic product containing a photosensitive silver halide element, a photographic reagent capable of processing said silver halide element, and processing liquid in sufficient quantity to render said reagent effective for processing said silver halide element, said product comprising a first layer, a second layer, a rupturable containing means holding said processing liquid, a third layer substantially opaque to visible light actinic to said silver halide element, a fourth layer substantially opaque to visible light actinic to said silver halide element, hinge means providing a leader, and an envelope having walls which are opaque to visible light actinic to said silver halide element, said hinge means, said first and second layers and said containing means being so attached together as to permit said first and second layers to be superposed with said silver halide element held between the outer surfaces thereof and with said containing means in a position to release its liquid between said first and second layers to permeate said silver halide element, said processing liquid, upon release from said containing means, rendering said reagent effective to process said silver halide element, said third and fourth layers being secured together by said hinge means so as to be superposable on both sides of said first and second layers when the latter are superposed, said envelope surrounding at least said silver halide element to protect the latter against premature exposure to light actinic thereto, said envelope having an end thereof extending beyond the end of the remainder of the product, said envelope end being located at the opposite end of said product from said hinge means, said envelope being slidably associated with said silver halide element so as to be readily slipped therefrom when moved in a direction away from said leader, said four layers, said silver halide element and said containing means being movable as a unit together with said leader, said third and fourth layers, when superposed upon one another, enveloping said silver halide element to protect the latter from light actinic thereto subsequent to the exposure thereof and the removal therefrom of said envelope.

8. The product of claim 7 wherein the photographic reagent is a substance from the class consisting of the silver halide developers and the silver halide solvents.

9. The product of claim 7 wherein the silver halide element is an emulsion cast directly on said first layer.

10. The combination of claim 1 wherein the light-excluding envelope is slidably mounted so as to enclose only the photosensitive liquid-confining layer of said unit.

11. The combination of claim 1 wherein said envelope is slidably mounted on said film unit so as to enclose both of said liquid-confining layers.

12. The combination of claim 1 wherein the photosensitive portion comprises a silver halide emulsion and the processing liquid includes a reagent from the class consisting of the silver halide developers and the silver halide solvents.

13. A photographic product comprising, in combination, a film unit including a photosensitive element, a photographic reagent capable of processing said element, processing liquid for rendering said reagent effective to process said element, rupturable containing means for carrying said processing liquid, a first liquid-confining layer supporting said photosensitive element, a second liquid-confining layer and hinge means securing together said layers and said containing means so that said containing means is located for releasing its liquid content between said liquid-confining layers to process said photosensitive element, said hinge means being adjacent one end of said film unit; an envelope having walls which are opaque to visible light actinic to said photosensitive element and surrounding at least said photosensitive element to protect the latter against premature exposure, said envelope having an end thereof extending beyond the end of said film unit opposite said hinge means, said envelope being slidably associated with said photosensitive element so as to be readily slipped therefrom when moved in a direction away from said hinge means; and a magazine holding said film unit and said envelope, said magazine comprising means providing a first withdrawal passage adjacent one end of said magazine and means providing a second withdrawal passage adjacent the other end of said magazine, a portion at least of the hinge means of said film unit extending through said first passage to provide a leader outside said magazine, said envelope having said end thereof extending through said second passage, each said passage comprising means for rendering the same substantially lighttight when said film unit and said envelope extend therethrough.

14. The product of claim 13 wherein said film unit comprises a third layer which is opaque to light actinic to said photosensitive element, and a fourth layer which is opaque to light actinic to said photosensitive element, said third and fourth layers being secured together adjacent the ends thereof by said hinge means so as to be superposable on both sides of said first and second layers when the latter are superposed, said third and fourth layers, when so superposed, enveloping said photosensitive element to protect the latter from light actinic thereto subsequent to the withdrawal thereof from said magazine.

15. The product of claim 13 wherein said photosensitive element comprises as a photosensitive material thereof a heavy metal salt capable of forming a latent image upon photoexposure and capable of development to produce a visible image comprising the metal of said salt.

16. The product of claim 13 wherein said photosensitive element comprises as a photosensitive material thereof a silver halide and said photographic reagent is a substance from the class consisting of the silver halide developers and the silver halide solvents.

17. A photographic product comprising, in combination, a film unit including a photosensitive element, a photographic reagent capable of processing said element, processing liquid for rendering said reagent effective to process said element, rupturable containing means for carrying said processing liquid, a first liquid-confining layer supporting said photosensitive element, a second liquid-confining layer and hinge means securing together said layers and said containing means so that said containing means is located adjacent said hinge means for releasing its liquid content between said liquid-confining layers to process said photosensitive element, said hinge means being adjacent one end of said film unit; an envelope having walls which are opaque to visible light actinic to said photosensitive element and surrounding at least said photosensitive element to protect the latter against premature exposure, said envelope having an end thereof extending beyond the end of said film unit opposite said hinge means, said envelope being slidably associated with said photosensitive element so as to be readily slipped therefrom when moved in a direction away from said hinge means; and a magazine holding said film unit and said envelope, said magazine comprising means providing a first withdrawal passage adjacent one end of said magazine and means providing a second withdrawal passage adjacent the other end of said magazine, a portion at least of the hinge means of said film unit extending through said first passage to provide a leader outside said magazine, said envelope having said end thereof extending through said second passage, each said passage comprising means for rendering the same substantially lighttight when said film unit and said envelope extend therethrough, said magazine having the internal walls thereof adjacent said first withdrawal passage more widely spaced than other portions of said internal walls to provide a somewhat enlarged chamber for receiving the portion of said film unit which includes said containing means to prevent premature rupture of said containing means.

18. A photographic product comprising, in combination, a self-processing film unit, an envelope, a magazine for holding said film unit and said envelope, said film unit comprising a pair of liquid-confining layers, one of said layers mounting a photosensitive element, rupturable containing means carrying a processing liquid, and hinge means securing together said liquid-confining layers and said containing means so that said liquid-confining layers are superposable with said containing means located for releasing its liquid content between said layers to process said photosensitive element, said hinge means providing a leader at one end of said film unit, said envelope being light-opaque and slidably associated with said photosensitive element so as to envelop the latter and protect the same against premature exposure to light, said envelope having an end portion thereof extending beyond the end of said film unit, said end portion being located opposite said hinge means, said magazine comprising withdrawal passages at opposite ends thereof, said hinge means extending through one of said withdrawal passages and said end portion of said envelope extending through the other of said withdrawal passages whereby each may be grasped exteriorly of said magazine and removed in opposite directions from said magazine.

EDWIN H. LAND.

REFERENCES CITED

The following references are of record in the file of this patent:

UNITED STATES PATENTS

| Number | Name | Date |
| --- | --- | --- |
| 253,354 | Eastman | Feb. 7, 1882 |
| 783,613 | Clarke | Feb. 28, 1905 |
| 786,535 | Thornton et al. | Apr. 4, 1905 |
| 916,325 | Kelly | Mar. 23, 1909 |
| 1,015,130 | Bohlin | Jan. 16, 1912 |
| 1,207,042 | Hochstetter | Dec. 5, 1916 |
| 1,256,981 | Christensen | Feb. 19, 1918 |
| 1,258,523 | Beck | Mar. 5, 1918 |
| 1,360,624 | Dodge | Nov. 30, 1920 |
| 1,467,543 | Hansen | Sept. 11, 1923 |
| 1,563,228 | Rodriquez | Nov. 24, 1925 |
| 1,618,575 | Cooper | Feb. 22, 1927 |
| 1,794,382 | Josepho | Mar. 3, 1931 |
| 1,823,296 | Sauer | Sept. 15, 1931 |
| 1,836,699 | Wood | Dec. 15, 1931 |
| 1,950,863 | Raguin | Mar. 13, 1934 |

(Other references on following page)

UNITED STATES PATENTS

| Number | Name | Date |
|---|---|---|
| 2,027,642 | Hewitt et al. | Jan. 14, 1936 |
| 2,201,511 | Williams | May 21, 1940 |
| 2,209,087 | Leuch | July 23, 1940 |
| 2,228,762 | Hafstein | Jan. 14, 1941 |
| 2,284,236 | Smith | May 26, 1942 |
| 2,322,005 | Fierke et al. | June 15, 1943 |
| 2,322,006 | Fierke et al. | June 15, 1943 |
| 2,322,027 | Fierke et al. | June 15, 1943 |
| 2,326,058 | Nadeau | Aug. 3, 1943 |
| 2,340,142 | Rauner | Jan. 25, 1944 |
| 2,352,014 | Rott | June 20, 1944 |
| 2,435,720 | Land | Feb. 10, 1948 |
| 2,543,181 | Land | Feb. 27, 1951 |

FOREIGN PATENTS

| Number | Country | Date |
|---|---|---|
| 815,877 | France | July 24, 1937 |
| 879,995 | France | Mar. 10, 1943 |
| 445,611 | Great Britain | Apr. 15, 1936 |
| 452,013 | Great Britain | Aug. 13, 1936 |
| 476,614 | Great Britain | Dec. 13, 1937 |
| 480,108 | Great Britain | Feb. 14, 1938 |